United States Patent Office 3,525,125
Patented Aug. 25, 1970

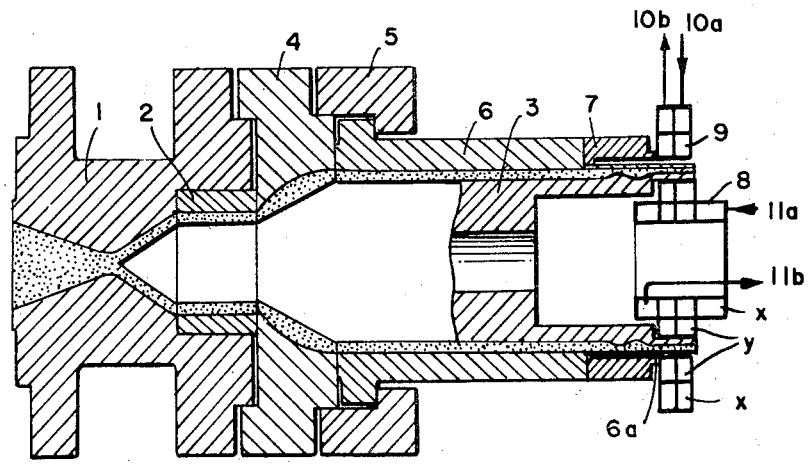
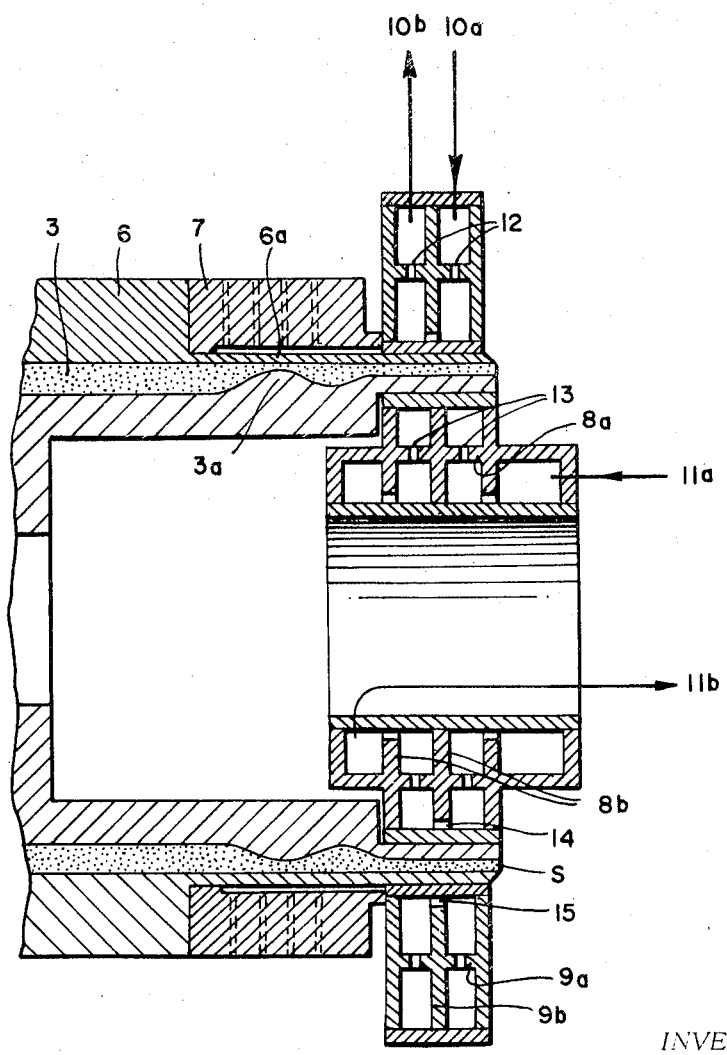

3,525,125
ANNULAR DIE FOR EXTRUDERS, PARTICULARLY AN ANNULAR DIE FOR THE PRODUCTION OF BLOWN TUBULAR FILM AND SHEETING FROM EXPANDABLE THERMOPLASTICS
Wolfgang Berger and Reinhold Weber, Ludwigshafen (Rhine), Germany, assignors to Badische Anilin- & Soda-Fabrik Aktiengesellschaft, Ludwigshafen (Rhine), Germany
Filed July 10, 1968, Ser. No. 743,827
Claims priority, application Germany, July 12, 1967, 1,704,482
Int. Cl. B29d 23/04
U.S. Cl. 18—14                                       4 Claims

ABSTRACT OF THE DISCLOSURE

An annular die attachable to an extruder for the production of hollow sections and tubular film and sheeting, particularly from expandable thermoplastics, comprising on each side of the die orifice a multi-cellular system of chambers for the passage therethrough in a predetermined way of a heating or cooling medium.

---

The invention relates generally to annular dies for extruders and more specifically to an annular die which in the region of the die orifice can be heated and cooled, for the production of blown tubular film and sheeting from expandable plastics.

The production of tubular film and sheeting which may be only 0.1 to 0.3 mm. in thickness, from a thermoplastic material by the blown-bubble extrusion process using an extruder provided with an annular die, is already known in the art. In such applications the annular die must satisfy very high requirements with respect to the adjustability of the outlet cross section and the control of the temperature a the die orifice. With the aid of such annular dies film and sheeting 0.3 to 5 mm. in thickness has already been successfully produced from expandable plastics. The annular die must be specially designed to prevent foaming of the expandable plastic material in the thread of the extruder screw and in the flow channels of the die. More particularly, in the region of the die lips no substantial pressure or temperature gradients which would interfere with the subsequent process of expansion should be allowed to develop. This requirement is all the more difficult to fulfill, the more uniform and the thinner the sheeting is intended to be. In the structural design of annular dies for the production of blown tubular film and sheeting from expandable plastics melts, the configuration of the cross sections of the flow channels at the die orifice and the steps taken for controlling the temperature in this region are particularly critical.

It is the object of the present invention to provide an annular die that can be heated and cooled and that is suitable for the production of blown tubular film and sheeting and is so contrived that non-uniform flow channels and velocities of flow in the annular orifice of the die as well as non-uniform temperature distribution at the die orifice are avoided. According to the invention this object is achieved by means of an annular die in which the heating and cooling chambers in the mandrel and in the outer ring are subdivided by a plurality of partitions arranged approximately parallel and radial to the die axis, the partitions that are parallel to the axis separating two systems of compartments that are different distances away from the annular orifice of the die that is to be heated and cooled, said systems of compartments intercommunicating through narrow openings.

According to another feature of the invention the system of divided compartments on the outer ring of the nozzle orifice is detachably slidably mounted on an elastically flexible thin adjustable lip of the outer die cylinder.

Other features of the invention will be understood from the following description in which reference is made to the accompanying drawings.

A holder 2 is firmly inserted into the outlet piece 1 of the extruder. This holder carries a mandrel 3 on webs which cannot be seen in the cross section shown in the drawings. The mandrel 3 has a preferably stepped cavity drilled into it from the die orifice end. For defining the outer contour of the flow path a cylinder 6 is affixed to the face of the outlet piece 1 by means of a threaded ring 5 and an intermediate adapter 4. Near the die orifice this cylinder 6 has a reduced external diameter and thus forms a thin sleeve 6a which is elastically deformable for adjusting, by external means, the terminal cross section of the annular orifice of the die. To this end a ring 7 with preferably radially placed adjusting screws is arranged to embrace the sleeve 6a. In order to avoid the creation of non-uniform flow through the annular orifice of the die the mandrel 3 has a peripheral bulge 3a located a given distance away from the annular die orifice for temporarily impeding the flow the plasticized material.

Axially along the final flow path a chamber 8 for a heating or cooling medium is removably fitted into the bore of the mandrel 3, and a corresponding heating or cooling chamber 9 is detachably mounted on the elastically deformable sleeve 6a in a position which radially aligns with the chamber 8.

As will be understood more particularly from FIG. 2 the annular heating or cooling chambers 8 and 9 are internally subdivided by partitions, one partition 8a or 9a respectively being arranged parallel to the die axis. Compartments X which are further away and compartments Y which are closer to the annular orifice S of the die that is to be heated and/or cooled are thus formed both in the heating or cooling chamber 8 in the mandrel 3 and in the corresponding chamber 9. According to the surface that is available for the transfer of heat and the axial space available in the mandrel these compartments X and Y are further subdivided by partitions 8b and 9b arranged roughly radial to the die axis. The inlet connections 10a and 11a and the outlet connections 10b and 11b are provided in the compartments X that are further away from the annular orifice S of the die. From the compartments X the heating and/or cooling medium enters the compartments Y that are closer to the annular orifice of the die through a plurality of small radial openings 12 and 13. Owing to the relative smallness of the cross sections of the openings 12 and 13 this indirect method of supplying the compartments adjacent to the heat-exchanging surfaces of the annular orifice obviates a direct and adverse effect upon the desired rate of heat exchange of fluctuations in the temperature and/or rate of flow of the circulating heating and/or cooling medium. For eliminating adverse effects of fluctuations in the temperature and flow rate of the heating or cooling medium, the direction of flow through the compartments Y is also important. The radial partitions 8b and 9b are provided with openings 14 and 15 which provide communication between the several compartments Y in proximity to the heat exchanging surfaces. With reference to the location of the supply connections 10a and 11a and of the outlet connections 10b and 11b the radial openings 12 and 13 in the partitions parallel to the die axis and the axial openings 14 and 15 in the radial partitions should be so distributed that the heating or cooling medium, for instance for processing expandable thermoplastics, will flow through the system of compartments Y contrary to the direction of extrusion of the plastic material. For other materials and/or in the case of other, for instance asymmetrical profiles, the distribution of the openings in the radial and parallel partitions may be different in order to establish other paths of flow through the two compartment systems X and Y.

We claim:

1. An annular die for an extruder, particularly an annular die for the production of blown tubular film and sheeting from expandable thermoplastics, comprising a stationary mandrel containing heating and cooling chambers and an adjustably centered cylinder having heating and cooling chambers incorporated therein or mounted thereon in the region of the annular orifice of the die, in which the heating and cooling chambers in the mandrel and on the cylinder are subdivided by partitions arranged approximately parallel to the die axis and partitions approximately radial to the die axis, and in which the partitions arranged parallel to the axis separate two systems of compartments which are different distances away from the annular orifice of the die that is to be heated or cooled, said system of compartments intercommunicating through narrow openings.

2. An annular die as claimed in claim 1, wherein the inlet and outlet connections for the heating or cooling medium are provided in the system of compartments which is more remote from the annular orifice of the die.

3. An annular die as claimed in claim 1, wherein the system of compartments which is closer to the annular orifice of the die and thus provides immediate heat exchange with said orifice that is to be heated or cooled, is traversed by the heating or cooling medium in a direction contrary to the direction of extrusion of the plastic material.

4. An annular die as claimed in claim 1, in which the divided heating or cooling chamber mounted on the ring forming the outer wall of the annular orifice of the die is detachably fitted on an elastically yielding thin lip of the cylinder.

References Cited

UNITED STATES PATENTS

| | | | |
|---|---|---|---|
| 1,780,948 | 11/1930 | Sherman | 18—14 XR |
| 2,057,467 | 10/1936 | Williams | 18—14 |
| 3,369,273 | 2/1968 | Moran | 18—14 |

WILLIAM J. STEPHENSON, Primary Examiner